Feb. 22, 1949.  W. J. OESTERLEIN  2,462,765
WELDED MOTOR FRAME
Filed Dec. 13, 1944  2 Sheets-Sheet 2
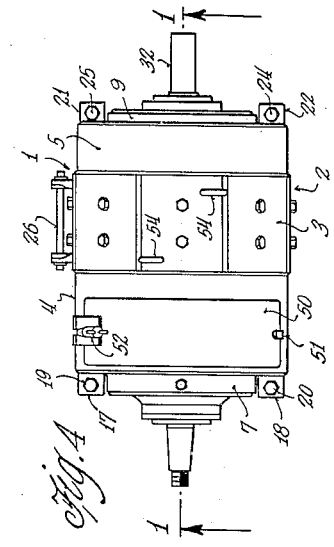
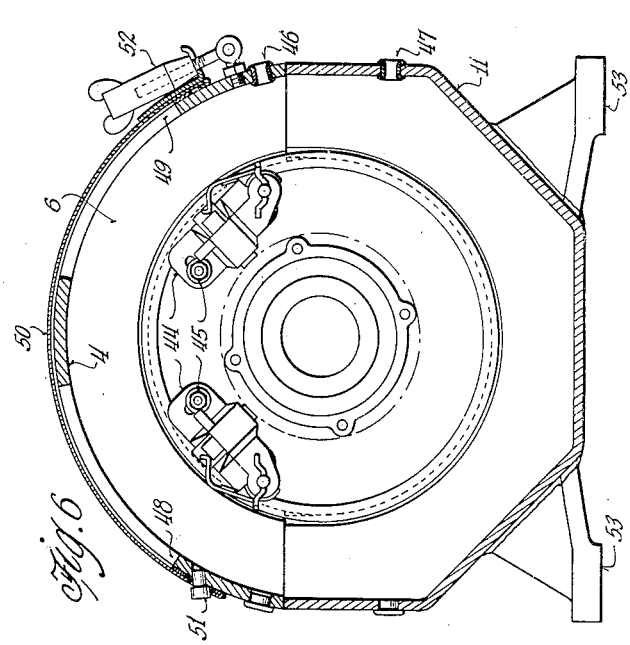
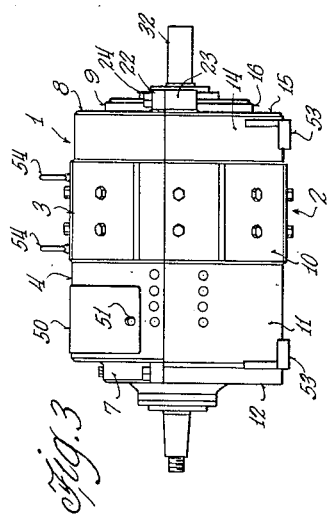
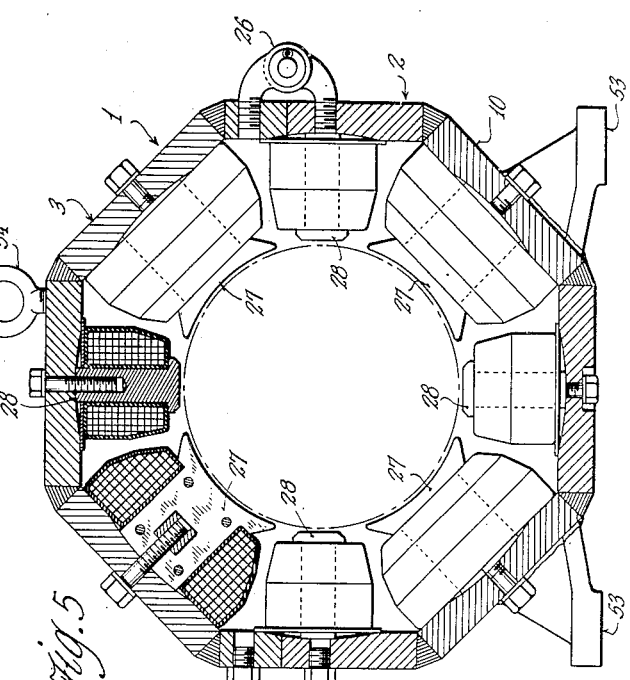
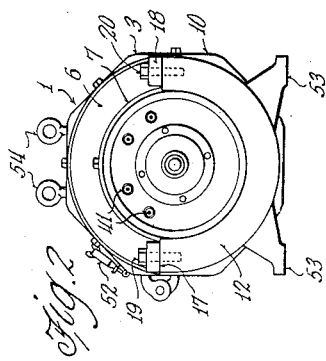
INVENTOR.
William J. Oesterlein
BY
David A. Fox
ATTORNEY.

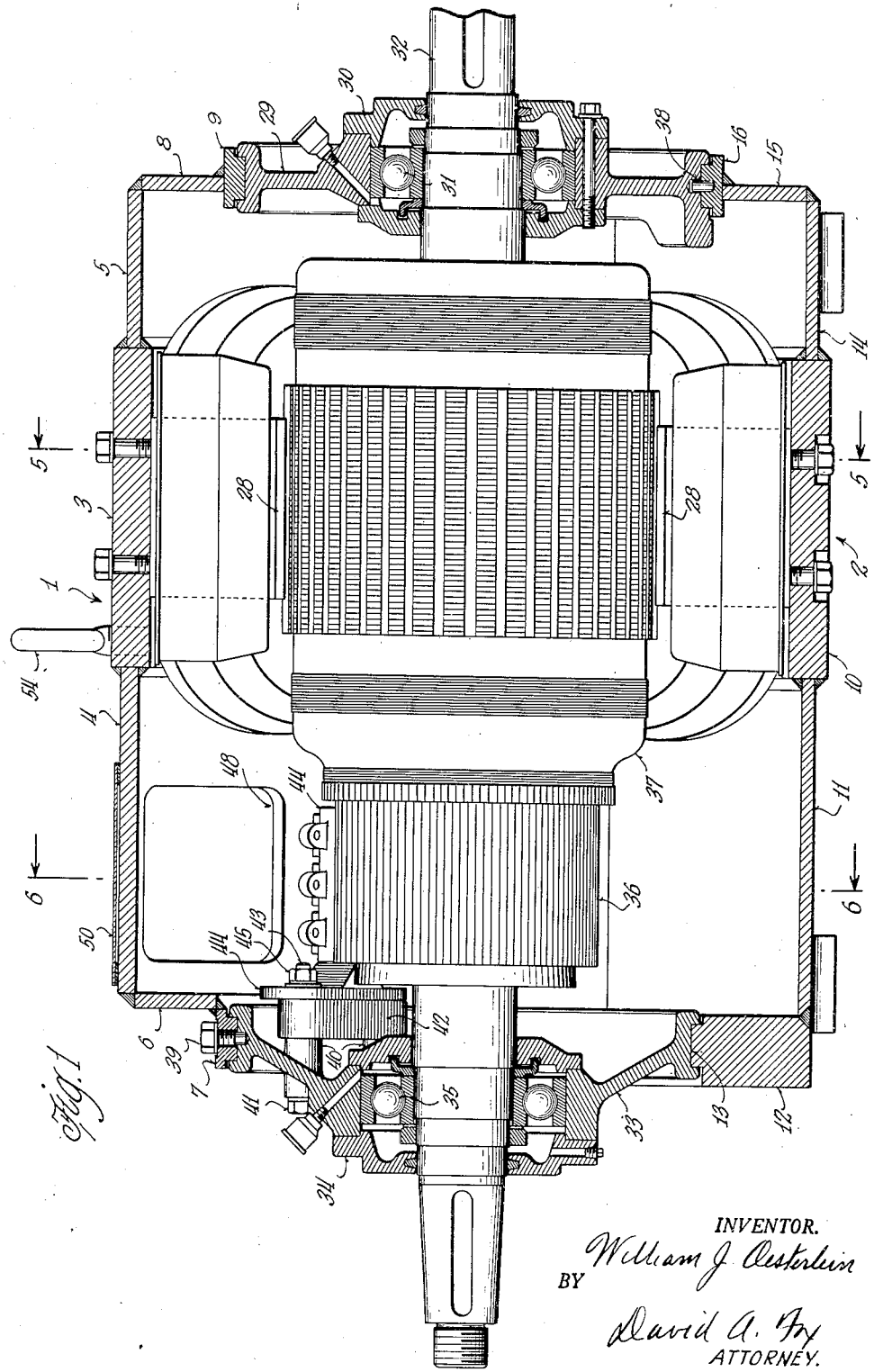

Patented Feb. 22, 1949

2,462,765

UNITED STATES PATENT OFFICE 2,462,765

WELDED MOTOR FRAME

William J. Oesterlein, Wauwatosa, Wis., assignor to Harnischfeger Corporation, Milwaukee, Wis., a corporation of Wisconsin Application December 13, 1944, Serial No. 567,984

3 Claims. (Cl. 172—36)

This invention relates to electric motors and particularly to that type of electric motor which has hingeable joined upper and lower portions which may be opened for inspection and repair. Motors of this type are commonly called mill-type motors, and this invention resides in an improvement in the construction of the frame of such motors which makes possible the replacement of the heavier castings heretofore employed with lighter rolled steel, and in which the difficulty of the machining required is minimized and the accuracy of the same enhanced.

Heretofore, in the construction of mill-type motors, the frame has been made up of a lower yoke casting and of an upper yoke casting which meet at a horizontal dividing plane to form a complete field ring and enclosure for the motor parts. The material from which such castings are made must be chosen for its magnetic properties, and such special alloy is utilized to very poor advantage in all parts of the motor except the field ring itself, with the result that the material cost for such construction is excessive. Furthermore, the completeness of the enclosure provided by such castings having bearing seats no larger than the bearings themselves make necessary the use of a very slender boring bar and a long, easily deflected boring tool in order to reach and machine accurately located surfaces to which pole pieces may be attached. Such an operation is slow, difficult and expensive.

According to the present invention, the parts forming the upper and lower separable halves of the motor frame are formed of field ring portions of suitable magnetic material to which extensions forming the remainder of the housing are secured by welding, thus permitting the utilization of special magnetic alloy if desired only in the part where needed and in the amount specifically required, and also permitting the utilization of rolled or forged steel plate, which, by reason of its superior physical properties, permits a substantial reduction in weight. Furthermore, the motor of this invention employs separate bearing housings of large diameter so that when the upper and lower halves of the motor frame are faced off and secured together, bearing housing seats as well as the seats for the pole pieces may be machined using a rigid boring bar of large diameter and a short, rigid boring tool, thus insuring the required accuracy without resort to difficult and specialized technique.

The objects and advantages of this invention will be further rendered apparent by the following description which is directed to that form of the apparatus of this invention which is set forth in the drawings hereto attached and forming a part hereof, the same being set forth and described by way of illustration and not of limitation.

In the drawings:

Fig. 1 is a side sectional view in elevation of one instance of a motor embodying this invention, viewed through the plane 1—1 indicated in Fig. 4, Fig. 2 is an end view in elevation of the motor shown in Fig. 1, Fig. 3 is a side view in elevation of the motor shown in Fig. 1, Fig. 4 is a top plan view of the motor shown in Fig. 1, Fig. 5 is an end view in section and in elevation of the motor shown in Fig. 1 viewed through the plane 5—5 as indicated in Fig. 1, and Fig. 6 is an end view in elevation and in section of the motor shown in Fig. 1 viewed through the plane 6—6 as there indicated.

As shown in the drawings, the form of the motor of this invention there appearing is provided with a frame made up of an upper partial yoke member designated generally by the numeral 1, and a lower partial yoke member designated generally by the numeral 2. The upper yoke member 1 is formed of a central partial field ring portion 3 comprising a plurality of relatively heavy, flat steel plates in polygonal arrangement, forming a series of flat inwardly facing surfaces. The flat plates making up the partial field ring 3 are united at their angular junctures by welding, but it is possible to form the partial field ring 3 if desired from a single bar which is bent to the configuration shown instead of being made up of separate pieces joined by welding. In either case the material constituting the partial field ring 3 is preferably a steel of low carbon content having desirably large magnetic permeability.

Secured to one side of the partial field ring 3 and extending longitudinally therefrom is a yoke extension 4 joined to the field ring 3 by welding, as appears more clearly in Fig. 1. On the opposite side of the field ring 3 and likewise secured thereto by welding is a yoke extension 5, shorter in length than the extension 4 but similar thereto in other respects.

Secured to the outer end of the extension 4 is an inwardly facing rim 6, united thereto by welding as appears in Fig. 1. The inner edge of the rim 6 terminates at, and is joined by welding to, an upper split-bearing-housing seat 7. At the outer end of extension 5 is a similar rim 8, as well as a similar upper split-bearing-housing seat 9 welded in place as shown.

The lower partial yoke member 2 is likewise made up of a central lower partial field ring portion 10 comprising a series of polygonally arranged flat steel plates composed if desired of high permeability steel united at their angular junctures by welding as shown in Fig. 5. Here again a single bent bar may be used in place of the separately joined plates if desired. The lower field ring portion 10 is disposed directly beneath and cooperates with the upper field ring portion 3 to form a complete field ring.

Secured to one side of the partial field ring portion 10 by welding is a yoke extension 11 which is disposed beneath and corresponds to the yoke extension 4. At the outer end of extension 11 and secured thereto by welding is an inwardly facing rim 12 having formed on the inner edge thereof a lower split-bearing-housing seat 13 which is disposed beneath and cooperates with the upper seat 7 to form a complete bearing housing seat.

Secured to the opposite side of the lower field ring portion 10 is a lower yoke extension 14 welded in place as shown which is disposed beneath and corresponds to the extension 5. United by welding with the outer end of extension 4 is an inwardly facing rim 15 bearing a welded-in-place lower-split-bearing-housing seat 16 which is disposed beneath and cooperates with the upper split seat 9 to form a complete bearing housing seat.

The parts thus far described constitute a complete motor yoke in the form of separable upper and lower portions divided at a horizontal plane. In order to secure the upper and lower portions to one another, pierced lugs 17 and 18 welded to the rim 6 are disposed as shown above tapped openings in the ends of rim 12. Cap screws 19 and 20 are received within the pierced lugs 17 and 18 and engage the tapped openings in the rim 12 as shown in Figs. 2 and 3. At the opposite end of the motor pierced lugs 21 and 22 welded to the rim 8 meet with tapped lugs (one of which is designated 23 in Fig. 3) welded to the rim 15, and are held together by cap screws 24 and 25 both of which appear in Fig. 4. To facilitate opening of the yoke for inspection a hinge 26 is secured to the upper and lower yoke sections as shown.

In manufacture it is convenient to first machine the meeting faces of the upper and lower yoke portions and to then secure them together by the cap screws 19, 20, 24 and 25. While thus held rigidly, a boring operation is performed upon the bearing housing seats formed by the rings 7 and 12 at one end and the rings 9 and 16 at the other end. Simultaneously with this boring operation a similar operation may be performed upon the inner flat faces of the parts making up the upper and lower partial field ring portions in such a way that longitudinally cylindrical grooves concentric with the axis of the motor are formed as appears more clearly in Fig. 5. The grooves thus formed are shallow, being of sufficient extent only to provide an accurately positioned reference surface to which main pole pieces 27 and interpole pieces 28 may be secured. By thus machining the bearing housing seats and the pole piece seats simultaneously or in the same fixture, accurate dimensional relationship between them is easily secured.

To facilitate the work to be performed in machining the pole piece seats, the bearing housing seats at the ends of the motor are unusually large in diameter, the same having a diameter which is a major fraction of the diameter of the cylindrical surface which defines the location of the pole piece seats. Thus machining of the upper and lower yoke members while joined together is easily accomplished and easily carried on under effective control and inspection.

Mounted in interfitting engagement with the split seat formed by the bearing housing seat members 9 and 16 is a bearing housing 29 having a capsule 30 enclosing a bearing 31. The bearing 31 in turn engages and rotatably supports the end of motor shaft 32. At the opposite end of the motor a bearing housing 33 is mounted in interfitting engagement with the split bearing housing seat number 7 and 13. The bearing housing 33 likewise supports a capsule 34 enclosing a bearing 35 which engages and rotatably supports the opposite end of the shaft 32. The rotatable parts of the motor such as the commutator 36 and the armature 37 are carried upon the shaft 32 in the usual manner. To prevent turning of the bearing housings 29 and 33 within the seats which support them, stop pins are provided. In the case of the housing 29, the pin 38 appearing in Fig. 1 is employed, while in the case of housing 33 the stop pin is in the form of a threaded screw 39 which may be withdrawn to permit rotatable adjustment of the housing 33 for a purpose to be more fully described.

As a mounting for the brushes which engage the commutator 36 inwardly extending bosses 40 formed integrally with the housing 33 are provided. Two bosses 40 are provided for the support of each brush holder and they are centrally bored to receive studs which are moulded in place in the ends of an insulating separator bar 42 and which pass outwardly through the bosses 40 where they are engaged by nuts 41. Also moulded in place in insulator bar 42 are studs 43 which extend inwardly through openings provided therefor in brush mountings 44. Nuts 45 engaging the studs 43 hold the brush mountings 44 securely in place. By thus mounting the brushes, the motor may be opened for inspection or repair without disturbance of the adjustment of the brushes. If it is necessary to make precise adjustment in the location of the brush assembly with reference to the pole pieces of the motor, this may be done at the outset by rotating the housing 33 in its seat prior to boring the socket in which the end of screw 39 is received. When the exact adjustment desired is attained, this socket may be bored and the screw 39 inserted to maintain the brush adjustment against further displacement.

Windings for the pole pieces 27 and 28 and electrical connections therefor may be provided in the customary manner depending upon the type of duty which the motor is expected to perform. Since this forms no part of this invention, such connections are not shown in the drawings. Provision for emergence of wiring leads from the upper and lower halves of the motor for the purpose of making such connections is made in the form of openings 46 and 47 close to the hinge line of the motor.

To render the brushes and brush holders accessible without the necessity for opening the motor as a whole, apertures 48 and 49 are formed in the extension 4 and a closure for these apertures is provided in the form of resilient strap 50 anchored at one end by the pin 51 and at the other by the swing bolt and thumb screw 52.

A mounting base for the motor is provided in the form of feet 53 secured by welding in the locations shown. The customary lifting rings 54 may be attached as shown directly to the partial field ring 3.

It may be observed that the motor frame illustrated and described makes possible a simple, accurate and economical machining operation by which the essential dimensions of the frame are established. At the same time a rugged structure possessed of the weight-saving advantages of high strength materials is produced and material of special magnetic properties is utilized only where this special property is required.

I claim:

1. In a motor having a welded frame adapted to be hingedly opened a yoke comprising a polygonal central field ring of steel plate, pole pieces extending inwardly from said field ring, yoke extensions of thinner steel plate secured to each side of said field ring by welding, and an end rim at the outer end of each yoke extension secured thereto by welding extending inwardly and terminating at a circular end rim seat having an accurately formed bore and accurately formed oppositely facing transverse abutting surfaces, said yoke being horizontally divided into upper and lower portions at a plane disposed close to and parallel with the axis of said motor; a hinge at one side of said yoke; releasable fastening means on the opposite side of said yoke; a circular bearing housing having a centrally disposed bearing for each end of said motor, said bearing housings having accurately formed circular peripheral faces adapted to snugly engage the bores of said end rim seats and accurately formed oppositely facing transverse abutting surfaces adapted to snugly engage the transverse abutting surface of said end rim seats whereby said upper and lower yoke portions and said bearing housings are positively held longitudinally and transversely with respect to one another by the the closing of said motor frame; and a rotating assembly including a shaft mounted for rotation in the bearings in said housings.

2. In a motor having a welded frame adapted to be hingedly opened a yoke comprising a polygonal central field ring of steel plate, pole pieces extending inwardly from said field ring, yoke extensions of thinner steel plate secured to each side of said field ring by welding, and an end rim at the outer end of each yoke extension secured thereto by welding extending inwardly and terminating at a circular end rim seat having an accurately formed bore and accurately formed side faces, said yoke being horizontally divided into upper and lower portions at a plane disposed close to and parallel with the axis of said motor; a hinge at one side of said yoke; releasable fastening means on the opposite side of said yoke; a circular bearing housing having a centrally disposed bearing for each end of said motor, said bearing housings having outwardly facing peripheral grooves therein flanked by spaced flanges, the root diameters of said grooves being formed to be snugly received within the bores of said end rim seats, the flanges of said bearing housing grooves being spaced to closely embrace the side faces of said seats whereby said upper and lower yoke portions and said bearing housings are positively held longitudinally and transversely with respect to one another by the closing of said motor frame; and a rotating assembly including a shaft mounted for rotation in the bearings in said housings.

3. In a motor having a welded frame adapted to be hingedly opened a yoke comprising a polygonal central field ring of steel plate, pole pieces extending inwardly from said field ring, yoke extensions of thinner steel plate secured to each side of said field ring by welding, and an end rim at the outer end of each yoke extension secured thereto by welding extending inwardly and terminating at a circular end rim seat having an accurately formed bore and accurately formed oppositely facing transverse abutting surfaces, said yoke being horizontally divided into upper and lower portions at a plane disposed close to and parallel with the axis of said motor; a hinge at one side of said yoke; releasable fastening means on the opposite side of said yoke; a circular bearing housing having a centrally disposed bearing for each end of said motor, said bearing housings having accurately formed circular peripheral faces adapted to snugly engage the bores of said end rim seats and accurately formed oppositely facing transverse abutting surfaces adapted to snugly engage the transverse abutting surface of said end rim seats whereby said upper and lower yoke portions and said bearing housings are positively held longitudinally and transversely with respect to one another by the closing of said motor frame; and brush mountings secured to one of said bearing housings; means adapted to hold said bearing housing against rotation in a predetermined angular position of brush adjustment; and a rotating assembly including a shaft mounted for rotation in the bearings in said housings.

WILLIAM J. OESTERLEIN.

REFERENCES CITED

The following references are of record in the file of this patent:

UNITED STATES PATENTS

| Number | Name | Date |
|---|---|---|
| 1,291,263 | Tidlund | Jan. 14, 1919 |
| 1,317,233 | Starker | Sept. 30, 1919 |
| 1,317,335 | Tichenor | Sept. 30, 1919 |
| 1,456,120 | Burke | May 22, 1923 |
| 2,208,408 | Brecht | July 16, 1940 |